Patented Aug. 11, 1936

2,050,933

UNITED STATES PATENT OFFICE 2,050,933

PROCESS FOR INCREASING THE PRODUCTIVITY OF WELLS

Melvin De Groote, St. Louis, Mo., assignor to Tretolite Company, Webster Groves, Mo., a corporation of Missouri No Drawing. Application February 17, 1936, Serial No. 64,351

8 Claims. (Cl. 166—21)

This invention relates to a novel process for increasing the productivity of deep wells, such as oil wells, gas wells, water wells and brine wells. In view of the fact that the most important industrial application of the process is concerned with oil wells, I will hereinafter describe how the process is used to increase the output of oil wells.

When an oil well is drilled into an oil-bearing stratum, the release of pressure upon the oil deposit may cause the oil to flow naturally for a certain period of time, after which the volume of flow will, in most instances, gradually decrease to a point or degree where some procedure, such as pumping, must be employed, so as to insure the production of a profitable amount of oil. Thereafter, production may continue to decline until the quantity of oil obtained from the well is so small that it is not commercially practicable to continue the well in operation. In some instances the stoppage of oil output or decline in production, above referred to, is not caused by exhaustion of the oil supply, but, on the contrary, is caused by building up of solid deposits of wax, or of inorganic salts, in the channels or pores of the oil-bearing rock. The productivity of wells of the kind above mentioned may, in some instances, be wholly or at least partially regenerated by mechanical means, such as the use of an explosive, but there are various objections to such mechanical treatment, such as the high cost and danger of injuring the internal well structure itself.

In such instances, where the hydrocarbon gases, escaping from a well, lower the solubility of wax or paraffin bodies in the oil, with the result that wax or paraffin-like bodies are deposited in the oil-bearing stratum, one is confronted with considerable difficulty in attempting to remove such wax or paraffin-like bodies, due to their chemical inactivity. Asphaltic materials may act the same as wax. Indeed, it is not necessary for the oil-bearing strata to be clogged entirely with wax or paraffin-like bodies, but, on the contrary, a mere coating or film of wax or paraffin on calcareous matter sometimes prevents ordinarily effective acid-treating agents, such as hydrochloric acid, from combining with or removing the calcareous deposit, and thus presents the same sort of difficulty.

There are a number of methods or processes, involving the use of hydrochloric acid, that are effective for treating a clogged oil-bearing stratum consisting of a lime sand, a limestone, or a formation related to calcareous or magnesian formation, provided the clogging is due essentially to uncoated calcium carbonate or magnesium carbonate or the like. This is also true in such siliceous or similar strata, from which petroleum oil is derived, where there is a clogging of the oil sands, due to the presence of alkaline earth carbonates, and primarily calcium carbonate. It is believed that the subterranean water becomes saturated with calcium bi-carbonate under pressure, and that when the well is drilled and pressure released, some of the subterranean water escapes with the oil, with the result that the solubility of the calcium carbonate or bi-carbonate in the remaining subterranean water becomes reduced to such an extent or degree that precipitation takes place in the pores of the siliceous sand in the oil-bearing stratum. So far as the usual hydrochloric acid treatment is concerned, it is immaterial whether the formation itself is truly calcareous or argillaceous, or is a siliceous formation with a calcareous deposit. Naturally, magnesium carbonate deposits are susceptible to treatment as calcium carbonate deposits.

Obviously, if hydrochloric acid treatment is applied to an oil-bearing limestone formation, it may not only remove any deposited calcium carbonate, or the like, but it may increase the porosity of the limestone structure itself. Therefore, in actual use, the increased productivity is not limited to the removal of the relatively recent calcium deposit, but it may also be concerned with the increased natural porosity of the aged oil-bearing stratum itself. Some oil-bearing strata are not essentially calcareous in character, but may essentially be siliceous in character, or else, may represent limestone so high in siliceous content, that there is limited or no chemical reactivity towards hydrochloric acid.

U. S. patent No. 1,922,154, dated August 15, 1933, to Melvin De Groote, describes a method of treating clogged oil-bearing strata by means of emulsified acid, particularly hydrochloric acid, etc.

In my co-pending application for patent Serial No. 55,614 filed Dec. 21, 1935, I have disclosed a modification of or improvement on the process described in said De Groote patent, that is, particularly applicable to siliceous strata and which involves the use of an emulsified acid, such as hydrochloric acid, in reaction with a suitable fluoride, such as sodium fluoride to liberate hydrofluoric acid in situ, so as to attack siliceous oil-bearing strata.

Similarly, in my co-pending application for patent, Serial No. 64,349, filed Feb. 17, 1936, I have disclosed a process which is a modification of or improvement on the process described in the aforementioned De Groote patent, in that the acidic component consists of unmixed nitric and hydrochloric acids of certain specified strength and in certain designated ratios.

The production of acid-in-oil emulsions for employment in the above processes, or in various modifications of these processes, involves certain limitations insofar as one must employ an oil-soluble or oil-wettable emulsifying agent, and particularly one which is acid-resistant. Materials complying with such requirements are not particularly numerous, and therefore, it is desirable to have available means whereby stable emulsions of an acid in an oily vehicle may be obtained by use of emulsifying agents of lesser efficiency, or by use of smaller amounts of more efficient emulsifying agents.

It is believed that the effectiveness of an emulsifying agent is due to the fact that it is adsorbed at the outside of the interface and forms a coherent, elastic, tenacious film or encasement of matter. In my present process I produce effective acidic treating media of the kind described in the aforementioned De Groote patent, and co-pending applications, but I employ a means whereby the emulsifying reagent is reinforced by the presence of minute droplets of a gas together with its film of foaming agent. The minute or almost colloidal, or even colloidal bubbles of air, or the like, are within the dispersed, aqueous, acidic phase, and adsorb at the inside of the interface. Naturally, such minute bubbles of gas, with their film of frothing agent ordinarily would not form a tenacious film, or coating, or encasement of the kind which would have the desired properties of an emulsifying agent, but such inner wall of minute bubbles may be very effective in reinforcing or increasing the power of the emulsifying agent on the outside of the interface. Both are attracted to the interface by the same force, that is, the force or attraction which causes adsorption. Naturally, not all the air bubbles produced are entrapped in the inside phase. Perhaps the bulk of them, especially the larger ones, escape but even so, enough of the minute ones remain to serve the intended purpose.

The following is an example of the preferred procedure for practising my process: The crude oil containing a fairly large amount of naturally-occurring emulsifying agent, such as some of the heavier black oils found in the Eldorado-Smackover area of Arkansas is employed as the oily vehicle. A small amount, for instance $\frac{1}{10}$% to $\frac{1}{2}$%, or a trifle more, of a suitable frothing agent, such as saponin or peptone, is added to 100 gals. of 15% hydrochloric acid, prepared by diluting 15 volumes of concentrated acid to give 100 volumes of dilute acid. This solution of dilute acid, plus frothing agent, is subjected to agitation by means of air, natural gas, flue gas, carbon dioxide or any other suitable gaseous body, so as to produce a frothy mass, and particularly, so that the body of the aqueous acid solution is charged or supersaturated with a large quantity of minute gaseous bubbles. It is desirable that the size of the bubbles be as small as possible. Preferably while still in a state of agitation 400 gals. of black oil of the kind previously described are added thereto and emulsified by means of suitable agitation until a satisfactory emulsion of the water-in-oil type is produced.

Many of the gaseous particles will be of colloid size, or at least, of the size of materials which are known to stabilize emulsions. For instance, it is known that carbon black or finely-divided silica in the neighborhood of 200 or 300 mesh particle size will stabilize emulsions. The gaseous bubbles present are enclosed within the acid droplet, or within the acid dispersed phase. Such bubbles of gas, with their coating of frothing agent become adsorbed at the oil-water interface on the inside of the droplet, just as the emulsifying agent is adsorbed on the outside of the water droplet. Thus, there results a more stable emulsion, due to the presence of this inside coating of gaseous bubbles than one would be able to obtain in the absence of such internal bubble film. By this means it is possible to employ certain crude oils without addition of any added emulsifying agent, which would not be otherwise satisfactory, and it is also possible to employ smaller amounts of more efficient emulsifying agent or to employ emulsifying agents of the type which ordinarily would not be satisfactory enough.

Any suitable means may be employed for saturating the aqueous component with a suitable gas. One might, for example, employ solid carbon dioxide, which, when added to the aqueous acid component, would lower the temperature of same and saturate it with carbon dioxide at a lower temperature. Subsequent emulsification with increase in temperature would result in the dispersed, acidic phase being saturated with minute droplets of carbon dioxide, and thus producing the inner bubble film which reinforces the conventional outer emulsifying skin or encasement of matter.

Suitable frothing agents include materials such as soluble starch, gelatine, saponin, casein, peptone, various gums, such as gum acacia. Another class of suitable frothing agents includes materials such as polycyclic sulfonic acids; alkylated nuclear, substituted bi-cyclic sulfonic acids; sulfonic acid derivatives of hydroaromatic compounds; hydroxy aromatic sulfonic acids; and mono-cyclic, aromatic, sulfonic acids, where not more than two nuclear hydrogens have been substituted by alkyl groups, and especially where the substituting alkyl group does not contain more than four carbon atoms.

Specific examples of materials contemplated for use include the following: Phenol sulfonic acid; cresol sulfonic acid; xylene sulfonic acid; cresol di-sulfonic acid; toluene di-sulfonic acid, napthalene sulfonic acid, anthracene sulfonic acid, beta naphthol sulfonic acid, methyl naphthalene sulfonic acid, di-methyl naphthalene sulfonic acid, tri-ethyl naphthalene sulfonic acid, ethyl naphthalene sulfonic acid, di-ethyl naphthalene sulfonic acid, mono-propyl beta naphthalene sulfonic acid, mono-butyl beta naphthalene sulfonic acid, di-butyl naphthalene di-sulfonic acid, di-propyl naphthalene di-sulfonic acid, tetralin sulfonic acid, hexanol sulfonic acid, methyl hexanol sulfonic acid, cymene sulfonic acid, etc.

Other suitable frothing agents, which may be employed, are of the kind used in ore flotation processes, such as pine oil and the like, although they are generally not as effective as the kind previously described. Usually $\frac{1}{10}$ of 1% of the frothing agent may be sufficient, although in the case of gums $\frac{1}{10}$% to $\frac{1}{10}$%, or, in some instances, even more may be employed. The amount actually used will depend on various factors, such as the nature of the frothing agent itself, the particular acid selected, the strength of the acid, the temperature of the foam or froth produced, the mechanical means for producing the same, etc. However, since the principle which is fundamental to the invention has been clearly described, i. e., the production of numberless minute droplets within the dispersed acidic phase, it is only a matter of mere mechanical skill to select the most economical and most suitable frothing agent.

Needless to say, the use of an excessive amount of the frothing agent would tend to lower the surface tension of the acid component above 70 dynes, to a value below the surface tension of the oily vehicle, for example, 30 dynes, and in that event, either the emulsion would break, or be too unstable for practical purposes, or else would reverse into an oil-in-acid emulsion, or else result in a multiple emulsion. Therefore, it is desirable not to add an excess of the frothing agent, and indeed, it is generally better to add a small amount of the frothing agent and agitate until the optimum amount of foam or froth is produced, and if this is insufficient, then add more frothing agent. This is better practice than if one adds an excess amount of the frothing agent at the outset and only agitates for a relatively short period of time.

Attention is directed to the fact that the present process may be applied in conjunction with emulsified acid, which involves the use of a dormant demulsifier to insure delayed stability, as described in my co-pending application for patent Serial No. 55,616, filed Dec. 21, 1935.

In such instances where a suspension or solution of a fluoride is emulsified in conjunction with acid, obviously a part of the frothing agent to be employed could also be added to the suspension or solution of the fluoride, so as to increase the stability of the emulsified aqueous fluoride component, as well as being added to the acidic part, so as to increase the stability of the acid component.

Having thus described my invention, what I claim as new and desire to secure by Letters Patent is:

1. A process for increasing the productivity of wells, characterized by introducing into the well an emulsified, acidic treating medium of the water-in-oil type, in which the external phase consists of an oily vehicle with a hydrophobe emulsifier, produced by adding a suitable frothing agent to the aqueous acidic component and subjecting said mixture to substantial agitation, prior to emulsification, during which the aqueous component becomes the internal phase.

2. A process for increasing the productivity of wells, characterized by introducing into the well an emulsified hydrochloric acid treating medium of the water-in-oil type, in which the external phase consists of an oily vehicle with a hydrophobe emulsifier, produced by adding a suitable frothing agent to the aqueous acidic component and subjecting said mixture to substantial agitation, prior to emulsification, during which the aqueous component becomes the internal phase.

3. A process for increasing the productivity of wells, characterized by introducing into the well an emulsified hydrochloric acid treating medium of the water-in-oil type, in which the external phase consists of an oily vehicle with a hydrophobe emulsifier, produced by adding a frothing agent of the saponin type to the aqueous acidic component and subjecting said mixture to substantial agitation, prior to emulsification, during which the aqueous component becomes the internal phase.

4. A process for increasing the productivity of wells, characterized by introducing into the well an emulsified hydrochloric acid treating medium of the water-in-oil type, in which the external phase consists of an oily vehicle with a hydrophobe emulsifier, produced by adding a frothing agent of the peptone type to the aqueous acidic component and subjecting said mixture to substantial agitation, prior to emulsification, during which the aqueous component becomes the internal phase.

5. A process for increasing the productivity of wells, characterized by introducing into the well an emulsified hydrochloric acid treating medium of the water-in-oil type, in which the external phase consists of an oily vehicle with a hydrophobe emulsifier, produced by adding a frothing agent of the sulfo-aromatic type to the aqueous acidic component and subjecting said mixture to substantial agitation, prior to emulsification, during which the aqueous component becomes the internal phase.

6. A process for increasing the productivity of wells, characterized by introducing into the well an emulsified hydrochloric acid treating medium of the water-in-oil type, in which the external phase consists of an oily vehicle with a hydrophobe emulsifier, produced by adding a frothing agent of the mono-cyclic, sulfo-aromatic type to the aqueous acidic component and subjecting said mixture to substantial agitation, prior to emulsification, during which the aqueous component becomes the internal phase.

7. A process for increasing the productivity of wells, characterized by introducing into the well an emulsified hydrochloric acid treating medium of the water-in-oil type, in which the external phase consists of an oily vehicle with a hydrophobe emulsifier, produced by adding a frothing agent consisting of cymene sulfonic acid to the aqueous acidic component and subjecting said mixture to substantial agitation, prior to emulsification, during which the aqueous component becomes the internal phase.

8. A process for increasing the productivity of wells, characterized by introducing into the well an emulsified treating medium of the water-in-oil type, in which the external phase consists of an oily vehicle with a hydrophobe emulsifier and the internal phase consists of (a) a solution-suspension of a suitable fluoride and (b) a hydrochloric acid solution containing a frothing agent consisting of cymene sulfonic acid, said mixture of frothing agent and acid, being subjected to substantial agitation prior to emulsification during which the aqueous component becomes the internal phase.

MELVIN DE GROOTE.